United States Patent [19]

Sommer et al.

[11] 3,956,267

[45] May 11, 1976

[54] INDOLE-CONTAINING DISAZO DYESTUFFS HAVING A SULFATOALKYLENEOXY-SUBSTITUENT

[75] Inventors: Richard Sommer, Leverkusen; Gerhard Wolfrum, Bergisch-Neukirchen; Karl-Ludwig Moritz, Cologne, all of Germany

[73] Assignee: Bayer Aktiengesellschaft, Leverkusen, Germany

[22] Filed: Nov. 15, 1974

[21] Appl. No.: 524,268

Related U.S. Application Data

[63] Continuation of Ser. No. 231,729, March 3, 1972, abandoned.

[30] Foreign Application Priority Data

Mar. 4, 1971  Germany............................ 2110230

[52] U.S. Cl................................ 260/165; 260/196; 260/207; 260/319.1; 260/458; 260/575
[51] Int. Cl.² ................. C09B 31/14; C09B 33/12; D06P 3/06; D06P 3/24
[58] Field of Search .................................... 260/165

[56] References Cited
UNITED STATES PATENTS

| | | | |
|---|---|---|---|
| 3,070,592 | 12/1962 | Baumann et al.................... | 260/165 |
| 3,345,355 | 10/1967 | Raue................................. | 260/165 |
| 3,523,115 | 8/1970 | Grandjean......................... | 260/153 |

*Primary Examiner*—Floyd D. Higel
*Attorney, Agent, or Firm*—Plumley & Tyner

[57] ABSTRACT

Disazo dyestuffs which in form of the free acid correspond to the formula

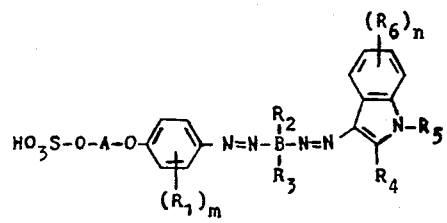

wherein A is an alkylene of 2–5 carbon atoms; $R_1$, $R_2$, and $R_3$ are hydrogen, chloro, bromo, alkoxy, or alkyl; $R_4$ is alkyl, phenyl, or substituted phenyl; $R_5$ is hydrogen, alkyl, or alkyl substituted by cyano, carbonamido, or carboxyl; $R_6$ is a substituent; B is 1,4-phenylene or 1,4-naphthylene; m is a number from 1 to 4; and n is a number from 0 to 2. These dyestuffs are useful for dyeing or printing natural or snythetic fibers containing amide groups, such as wool, silk or polyamide; and the resulting product is distinguished by good fastness properties.

11 Claims, No Drawings

INDOLE-CONTAINING DISAZO DYESTUFFS HAVING A SULFATOALKYLENEOXY-SUBSTITUENT

This is a continuation of application Ser. No. 231,729, filed Mar. 3, 1972, and now abandoned.

The subject of the present invention are new, valuable disazo dyestuffs which in the form of the free acid correspond to the general formula

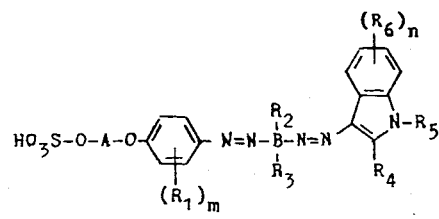

as well as their manufacture and use for dyeing synthetic fibre materials, especially those made of polyamides.

In the general formula (I),

A represents an alkylene radical with 2–5 C atoms, $R_1$, $R_2$ and $R_3$ represent hydrogen, chlorine, bromine, an alkoxy group or an alkyl group, $R_4$ represents an alkyl group which is not substituted further or an optionally substituted phenyl group, $R_5$ represents hydrogen or an alkyl group which is optionally substituted by a nitrile, carbonamide or carboxyl group, $R_6$ represents a substituent, especially alkyl, alkoxy, halogen, nitro, sulpho or nitrile, B represents a 1,4-phenylene or 1,4-naphthylene radical, $m$ represents the numbers 1–4 and $n$ represents the numbers 0–2.

If $n$ or $m > 1$, the radicals $R_1$ and $R_6$, respectively, can be identical or different.

Suitable radicals A are, for example —CH$_2$—CH$_2$—, —CH$_2$—CH$_2$—CH$_2$—,

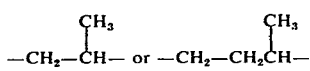

Suitable radicals B are, for example, the radicals of the formulae

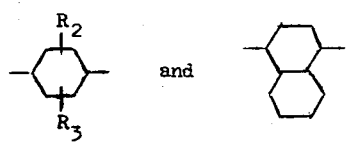

wherein $R_2$ and $R_3$ have the abovementioned meaning.

Preferred alkyl groups are those with 1–4 C atoms. Except $R_4$, the alkyl groups can possess further substituents. Suitable alkyl groups are, for example, —CH$_3$, —C$_2$H$_5$, —C$_3$H$_7$, —C$_4$H$_9$ and C$_2$H$_4$CH. Suitable phenyl-groups $R_4$ are phenyl and phenyl substituted by halogen, especially Cl, Br, alkyl, especially C$_1$ - C$_4$ - alkyl and alkoxy, especially C$_1$ — C$_4$— alkoxy.

Preferred alkoxy groups are those with 1–6 C atoms. The alkoxy groups can possess further substituents, for example OH groups. Suitable alkoxy groups are, for example, —OCH$_3$, —OC$_2$H$_5$, —OC$_3$H$_7$, —OC$_4$H$_9$, —OCH$_2$CH$_2$OH, and —OCH$_2$C$_6$H$_5$.

Preferred dyestuffs are those of the formula

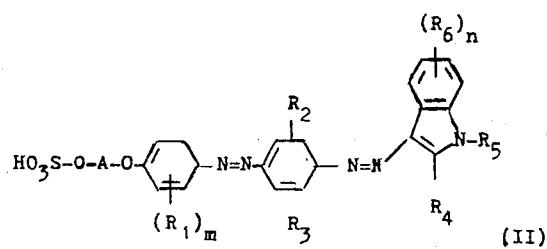

wherein A, $R_1$, $R_2$, $R_3$, $R_4$, $R_5$, $R_6$, $m$ and $n$ have the abovementioned meaning, and those of the formula

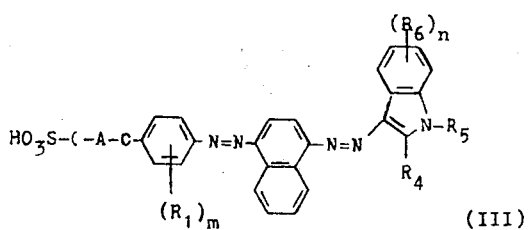

wherein A, $R_1$, $R_4$, $R_5$, $R_6$, $m$ and $n$ have the abovementioned meaning.

Particularly valuable dyestuffs are those of the formula

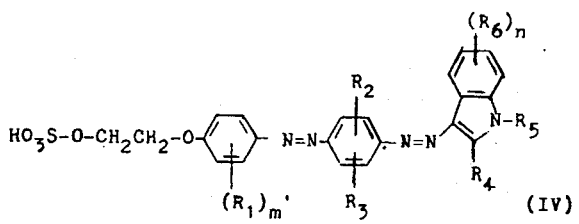

wherein $R_1$, $R_2$, $R_3$, $R_4$, $R_5$, $R_6$, $m$ and $n$ have the abovementioned meaning, especially those of the formula

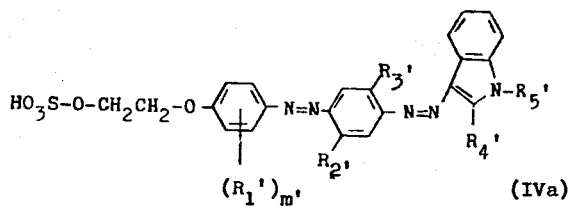

wherein $R_1'$ represents hydrogen, chlorine or a methyl or ethyl group, $R_2'$ represents hydrogen, chlorine or a methyl, ethyl, methoxy or ethoxy group, $R_3'$ represents hydrogen or a methoxy or ethoxy group, $R_4'$ represents alkyl with 1–4 C atoms or phenyl, $R_5'$ represents hydrogen or an alkyl group with 1–4 C atoms which is optionally substituted by a nitrile, carbonamide or carboxyl group and $m'$ represents the numbers 1 or 2.

The dyestuffs of the formula (I) are manufactured if amines of the formula

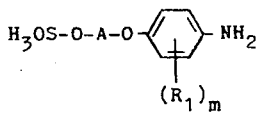 (V)

wherein $R_1$, $m$ and A have the abovementioned meaning, are diazotised and reacted with amines of the formula

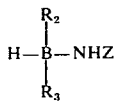 (VI)

wherein
$R_2$, $R_3$ and B have the abovementioned meaning and Z represents H, —$SO_3H$ or —$CH_2SO_3d$,
to give monoazo dyestuffs of the formula

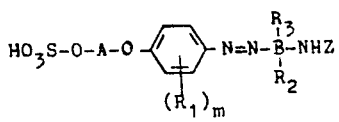 (VII)

the monoazo dyestuff thus obtained, after splitting off the group Z by alkaline or acid saponification, if necessary, are diazotised and coupled with an indole of the formula

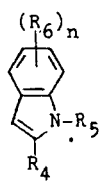 (VIII)

wherein $R_4$, $R_5$, $R_6$ and $n$ have the abovementioned meaning.

A further process for the manufacture of the dyestuffs (I) is that amines of the formula

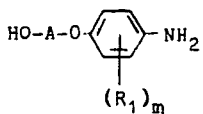 (IX)

wherein A, $R_1$ and $m$ have the abovementioned meaning, are diazotised and coupled with amines of the formula (V) to give monoazo dyestuffs of the formula

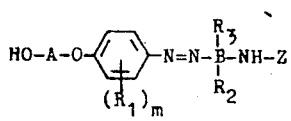 (X)

the latter are diazotised, if necessary after splitting off the radical Z by acid or alkaline saponification, and the product is coupled with an indole of the formula (VIII), and the disazo dyestuffs thus obtained, of the formula

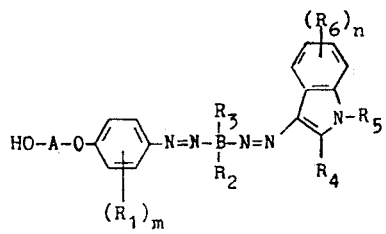 (XI)

wherein $R_1$ — $R_6$, A, B, $m$ and $n$ have the abovementioned meaning, are converted into the dyestuffs (I) by means of sulphonating agents, such as concentrated sulphuric acid, sulphuric acid monohydrate or oleum.

A further variant of the process according to the invention for the manufacture of the disazo dyestuffs (I) is that the monoazo dyestufs of the formula (X) are converted into the dyestuffs of the formula (VII) by means of sulphonating agents, such as concentrated sulphuric acid, sulphuric acid monohydrate or oleum, diazotised and coupled with indoles of the formula (VIII).

Examples of suitable amines of the formula (IX) are: ethylene glycol-(4-aminophenyl)-ether, trimethylene glycol-(4-aminophenyl)-ether, propylene glycol-(4-aminophenyl)-ether, ethylene glycol-(2-methyl-4-aminophenyl)-ether, trimethylene glycol-(2-methyl-4-aminophenyl)-ether, propylene glycol-(2-methyl-4-aminophenyl)-ether, ethylene glycol-(3-methyl-4-aminophenyl)-ether, trimethylene glycol-(3-methyl-4-aminophenyl)-ether, ethylene glycol-(2-ethyl-4-aminophenyl)-ether, ethylene glycol-(3-ethyl-4-aminophenyl)-ether, trimethylene glycol-(3-ethyl-4-aminophenyl)-ether, ethylene glycol-(2-methoxy-4-aminophenyl)-ether, trimethylene glycol-(2-methoxy-4-aminophenyl)-ether, ethylene glycol-(3-methoxy-4-aminophenyl)-ether, trimethylene glycol-(3-methoxy-4-aminophenyl)-ether, ethylene glycol-(2-ethoxy-4-aminophenyl)-ether, ethylene glycol-(3-ethoxy-4-aminophenyl)-ether, ethylene glycol-(2-chloro-4-aminophenyl)-ether, trimethylene glycol-(2-chloro-4-aminophenyl)-ether, propylene glycol-(2-chloro-4-aminophenyl)-ether, ethylene glycol-(3-chloro-4-aminophenyl)-ether, trimethylene glycol-(3-chloro-4-aminophenyl)-ether, ethylene glycol-(2-bromo-4-aminophenyl)-ether, ethylene glycol-(3-bromo-4-aminophenyl)-ether, ethylene glycol-(2,5-dimethyl-4-amino-phenyl)-ether, trimethylene glycol-(2,5-dimethyl-4-amino-phenyl)-ether, ethylene glycol-(2,6-dimethyl-4-aminophenyl)-ether, trimethylene glycol-(2,6-dimethyl-4-aminophenyl)-ether, ethylene glycol-(2,3-dimethyl-4-aminophenyl)-ether, ethylene glycol-(3,5-dimethyl-4-aminophenyl)-ether, ethylene glycol-(2,3,5-trimethyl-4-aminophenyl)-ether, trimethylene glycol-(2,3,5-trimethyl-4-aminophenyl)-ether, ethylene glycol-(2,3,5,6-tetramethyl-4-aminophenyl)-ether, ethylene glycol-(2,5-dichloro-4-aminophenyl)-ether, ethylene glycol-(2,6-dichloro-4-aminophenyl)-ether, trimethylene glycol-(2,6-dichloro-4-aminophenyl)-ether, ethylene glycol-(2-chloro-4-amino-5-methylphenyl)-ether or their acid sulphuric acid esters.

Examples of suitable middle components of the formula (VI) are: aniline, 2-aminotoluene, 3-aminotoluene, 2-aminoethylbenzene, 3-amino-ethylbenzene, 3-chloroaniline, 2-bromoaniline, 2-ami anisole, 3-aminoanisole, 2-amino-ethoxybenzene, 3-amino-ethoxybenzene, 1-amino-2,3-dimethylbenzene, 1-amino-2,5-dimethylbenzene, 1-amino-3,5-dimethylbenzene, 3-amino-4-methoxy-toluene, 2-amino-4-methoxy-toluene, 2-amino-1,4-dimethoxybenzene, 2-amino-4-ethoxy-toluene, 2-amino-1,4-diethoxybenzene, α-naphthylamine or their N-sulphonic acid or their N-ω-methanesulphonic acids.

Examples of suitable coupling components (VIII) are: 2-methylindole, 2-phenylindole, 1-methyl-2-phenylindole, 1,2-dimethylindole, 1-β-cyanoethyl-2-methylindole, 1-β-cyanoethyl-2-phenylindole, β-(2-phenylindolyl-1)-propionic acid amide, β-(2-methylindolyl-1)-propionic acid amide, β-(2-methylindolyl-1)-propionic acid, 2-β-naphthyl-indole, 2-p-biphenylylindole, 2,5-dimethylindole, 2,4-dimethyl-7-methoxyindole, 2-phenyl-5-ethoxyindole, 2-methyl-5-ethoxyindole, 2-methyl-5-chloroindole, 2-methyl-6-chloroindole, 2-methyl-5-nitroindole, 2-methyl-5-cyanoindole, 2-methyl-7-chloroindole, 2-methyl-5-fluoroindole, 2-methyl-5-bromoindole, 2-methyl-5,7-dichloroindole, 1-β-cyanoethyl-2,6-dimethylindole and 2-phenylindole-5-sulphonic acid and 1-methyl-2-phenyl-indole-5-sulphonic acid. The indole-sulphonic acids are obtained by the process described in German Patent Specification 137,117. Thereby, at least from the in 5-position unsubstituted indoles, the corresponding indole-5-sulphonic acids are formed.

The diazo components of the formula (V) as well as of the formula (IX) are diazotised in a manner which is in itself known, for example in an acid aqueous solution by means of sodium nitrite solution at 0°–20°C, and are combined with the coupling components of the formula (VI). The coupling can be carried out in a neutral to strongly acid pH range, but preferably in a weakly acid pH range, in an aqueous or organic-aqueous medium.

The monoazo dyestuff formed can be isolated either directly by virtue of their insolubility in water, if diazo components of the formula (IX) and coupling components of the formula (VI) with $Z = H$ are employed, or by salting out if diazo components of the formula (V) or (IX) and coupling components of the formula (VI) with $Z = SO_3H$ or $—CH_2SO_3H$ are employed. In general, in the latter case, isolation of the monoazo dyestuff is only necessary after the amino group of the coupling component has been liberated by alkaline or acid saponification. If diazo components of the formula (V) and coupling components of the formula (VI) with $Z = SO_3H$ or $—CH_2SO_3H$ have been employed, an alkaline treatment for liberating the amino group of the coupling component is preferred, since under these conditions the acid sulphuric acid ester is stable. An intermediate isolation of the monoazo dyestuffs is, however, not always necessary — they can also be further diazotised without isolation.

The further diazotisation of the aminoazo dyestuffs (VII) and (X) with $Z = H$ can be carried out, for example, in an acid aqueous dispersion by means of sodium nitrite solution, for which the diazotisation temperatures can be between 0° and 30°C. Aminoazo dyestuffs of the formula (VII) with $Z = H$ can furthermore also be diazotised indirectly by dissolving them in an alkaline solution, adding sodium nitrite solution and pouring the mixture into aqueous hydrochloric acid, or treating it with hydrochloric acid. The conversion of the aminoazo dyestuff (X) with $Z = H$ into the acid sulphuric acid ester can be effected by introducing (X) into concentrated sulphuric acid, sulphuric acid monohydrate or oleum at room temperature and stirring for several hours longer. The acid sulphuric acid ester of the dyestuff can then be precipitated by pouring into ice water and can be isolated, or can be further used by direct further diazotisation.

The coupling of the diazotised aminoazo dyestuffs (VII) with the terminal components (VIII) to give the disazo dyestuffs (I) is also effected in a manner which is in itself known, for example in a neutral, weakly acid or strongly acid aqueous medium or in an aqueous-organic medium. The disazo dyestuffs of the formula (I) are in general rather sparingly soluble in an acid medium and can be isolated by simply filtering them off, if necessary after addition of sodium chloride. If the dyestuffs are impure, they can be redissolved in hot water and reprecipitated, in a known manner, if necessary with addition of alkali. The more sparingly soluble dyestuffs (I) which have been isolated under acid conditions can be made readily water-soluble by mixing them with salts of strong bases and weak acids, for example trisodium phosphate, disodium hydrogen phosphate, sodium tetraborate, sodium metaphosphate, sodium metasilicate or sodium carbonate.

The coupling of the diazotised aminoazo dyestuffs (X) with the terminal components (VIII) to give the disazo dyestuffs (XI) is also carried out in a manner which is in itself known, for example in a neutral, weakly acid or strongly acid aqueous medium or in an aqueous-organic medium. The water-insoluble disazo dyestuffs can be easily isolated by filtration. After drying, they are converted into the disazo dyestuffs (I) by introducing them into concentrated sulphuric acid, sulphuric acid monohydrate or oleum and stirring for several hours longer, and these dyestuffs are isolated by precipitation in ice water and filtration and freed of adhering sulphuric acid by subsequent washing with water or dilute alkalis.

The new dyestuffs are particularly suitable for dyeing and printing natural and synthetic fibre materials containing amide groups, for example materials of wool, silk and polyamide such as poly-ε-caprolactam or the reaction products of hexamethylenediamine and adipic acid. The dyeings obtained, especially those on polyamide materials, are distinguished by good fastness properties, especially by good fastness to wet processing and good fastness to light. The neutral affinity, and the behaviour on combination with other suitable dyestuffs for this material, are also good.

In the examples which follow, the parts denote parts by weight and the percentages denote percentages by weight.

EXAMPLE 1

23.3 parts of the acid sulphuric acid ester of ethylene glycol-(4-aminophenyl)-ether are diazotised in a known manner in an aqueous solution containing hydrochloric acid and the product is coupled with 22 parts of m-toluidine-methanesulphonic acid at pH 3–3.5. After completion of the coupling, the coupling solution is mixed with 4% strength sodium hydroxide solution, and heated at the boil for 1½ – 2 hours, in order to split off the methanesulphonic acid radical. The aminoazo dyestuff thus formed is precipitated at pH 7.5 by neutralisation with hydrochloric acid, 15% strength sodium chloride being added to complete its separation, and is isolated. The monoazo dyestuff is again stirred up with 300 parts of water and 30 parts of concentrated hydrochloric acid and is thereafter further diazotised with 6.9 parts of sodium nitrite (as a 30% strength aqueous solution) at 25°–30°C. The suspension of the diazonium salt is thereafter run into a solution of 20.7 parts of 1-methyl-2-phenyl-indole in glacial acetic acid. The mixture is buffered somewhat with sodium acetate. After completion of coupling, the dyestuff is isolated in the usual manner, and dried. The dyestuff corresponds to the formula

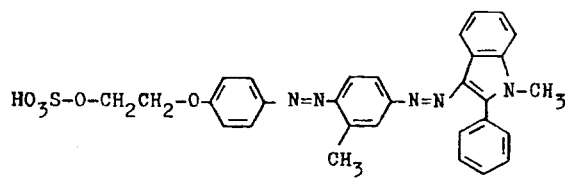

It dyes polyamide, from a weakly acid or neutral bath, in strongly yellowish-tinged orange shades. The dyeings show good fastness properties.

Dyeing Example 0.1 g of the dyestuff are dissolved in 100 ml of hot water, 5 ml of 10% strength ammonium acetate solution are added and the mixture is diluted to a volume of 500 ml with water. 10 g of polyamide fibre are introduced into the dyebath, the dyebath is raised to the boil over the course of 20 minutes, 4 ml of 10% strength acetic acid are added and the mixture is kept at the boil for one hour. The fibre is then rinsed and dried at 70°–80°C.

EXAMPLE 2

15.3 parts of ethylene glycol-(4-aminophenyl)-ether are diazotised in hydrochloric acid solution in a known manner and coupled with 22 parts of m-toluidinemethane-sulphonic acid, as described in Example 1. After completion of coupling, the coupling solution is treated with 4% strength sodium hydroxide solution and the mixture is stirred for half an hour at 50°C. The monoazo dyestuff which has precipitated is filtered off, stirred up with 300 parts of water and 30 parts of hydrochloric acid and diazotised at 20°–25°C with 6.9 parts of sodium nitrite (as a 30% strength aqueous solution). The brown diazonium salt solution is filtered and allowed to run into a solution of 19.3 parts of 2-phenyl-indole in glacial acetic acid. The mixture is slightly buffered with sodium acetate. After coupling, the dyestuff of the formula

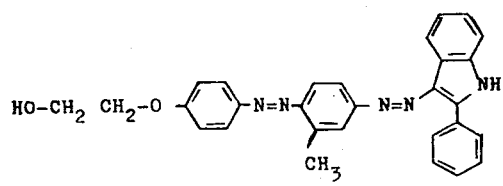

is isolated in the usual manner, dried and inroduced into 300 parts of concentrated sulphuric acid at 20°–25°C over the course of approx. 30 minutes. The sulphuric acid solution is stirred for a further 3 hours at room temperature and is then poured out onto sufficient ice for the temperature of the mixture not to exceed 10°C. The dyestuff of the formula

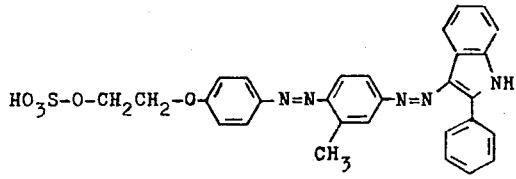

which has precipitated is filtered off and washed copiously with water until free of acid. It dyes polyamide in reddish-tinged orange shades having good fastness properties.

EXAMPLE 3

15.3 parts of ethylene glycol-(4-aminophenyl)-ether are diazotised as described in Example 4 and coupled, at pH 3–3.5, with a solution, buffered with sodium acetate, of 14 parts of 3-amino-4-methoxy-toluene in approx. 200 parts of dilute hydrochloric acid, whilst keeping the pH-value of the coupling solution at pH 3–3.5 by means of sodium acetate solution. After completion of coupling, the aminoazo dyestuff is filtered off, dried and introduced into 200 parts of concentrated sulphuric acid at 20°–25°C over the course of approx. 30 minutes. The mixture is stirred for a further 3 hours and is poured out onto sufficient ice for the temperature of the mixture not to exceed 10°C. The dyestuff of the formula

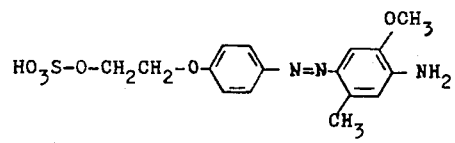

which has precipitated is isolated, stirred up with approx. 300 parts of water and 30 parts of concentrated hydrochloric acid and diazotised at 25°–30°C with 6.9 parts of sodium nitrite (as a 30% strength aqueous solution). The suspension of the diazonium salt is run into a solution of 19.3 parts of 2-phenyl-indole in glacial acetic acid. The mixture is somewhat buffered with sodium acetate. After completion of coupling, the dyestuff of the formula

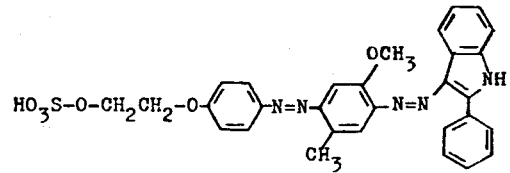

is isolated in the usual manner and dried. The dyestuff dyes polyamide in bluish-tinged red shades.

EXAMPLE 4

23.3 parts of the acid sulphuric acid ester of ethylene glycol-(4-aminophenyl)-ether are diazotised as described in Example 1, and the product is coupled to 14 parts of 3-amino-4-methoxy-toluene, as described in Example 5. After completion of coupling, the monoazo dyestuff is isolated and further diazotised as described in Example 3. The suspension of the diazonium salt is run into a solution of 20.7 parts of 1-methyl2-phenyl-indole in glacial acetic acid. The mixture is buffered somewhat with sodium acetate. After completion of coupling, the dyestuff of the formula

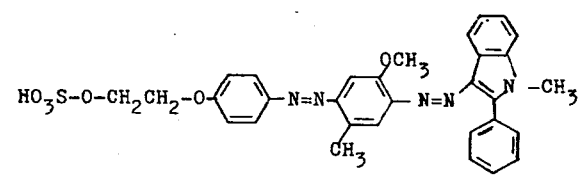

EXAMPLE 5

26.75 parts of the acid sulphuric acid ester of ethylene glycol-(2-chloro-4-aminophenyl)-ether are diazotised in a known manner in an aqueous solution containing hydrochloric acid, the product is coupled to 14 parts of 3-amino-4-methoxy-toluene as described in Example 3, and this product is further diazotised and coupled to 19.3 parts of 2-phenyl-indole as described in Example 3. The resulting dyestuff corresponds to the formula

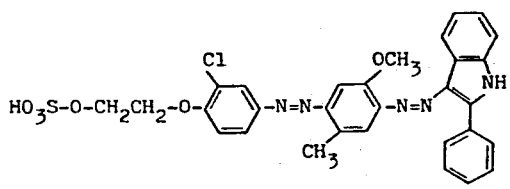

and dyes polyamide materials in bluish-tinged red shades.

EXAMPLE 6

28.15 parts of the acid sulphuric acid ester of trimethylene glycol-(2-chloro-4-aminophenyl)-ether are diazotised as described in Example 5, the product is coupled to 14 parts of 3-amino-4-methoxytoluene and the new product is further diazotised and coupled to 19.3 parts of 2-phenylindole as described in Example 3. The dyestuff thus obtained corresponds to the formula

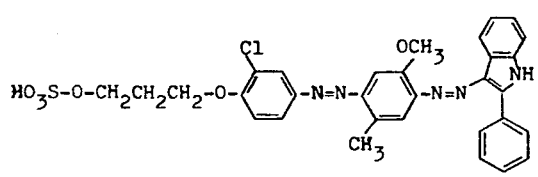

and dyes polyamide materials in bluish-tinged red shades of good fastness properties.

EXAMPLE 7

28.15 parts of the acid sulphuric acid ester of propylene glycol-(2-chloro-4-aminophenyl)-ether are diazotised as described in Example 5, the product is coupled to 14 parts of 3-amino-4-methoxy-toluene, and the new product is diazotised further and coupled to 19.3 parts of 2-phenyl-indole, as described in Example 3. The resulting dyestuff has the formula

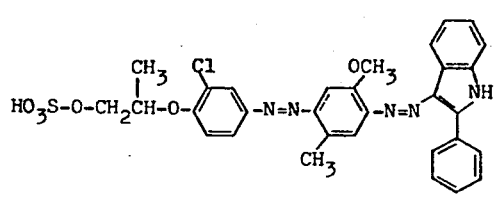

and dyes polyamide materials in bluish-tinged red shades of good fastness properties.

EXAMPLE 8

26.75 parts of the acid sulphuric acid ester of ethylene glycol-(3-chloro-4-aminophenyl)-ether are diazotised in the usual manner in an aqueous solution containing hydrochloric acid, the product is coupled to 22 parts of m-toluidinemethanesulphonic acid, as described in Example 1, the methanesulphonic acid radical is split off and the product is diazotised further. The suspension of the diazonium salt is run into a solution of 20.7 parts of 1-methyl-2-phenyl-indole in glacial acetic acid. The mixture is slightly buffered with sodium acetate. After completion of coupling, the dyestuff of the formula

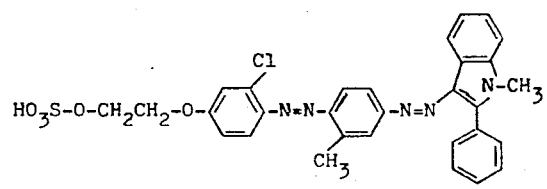

is isolated in the usual manner and dried. The dyestuff dyes polyamide in yellowish-tinged orange shades.

EXAMPLE 9

24.7 parts of the acid sulphuric acid ester of ethylene glycol-(3-methyl-4-aminophenyl)-ether are diazotised as described in Example 1, the product is coupled to 19.5 parts of aniline-methanesulphonic acid, the methane-sulphonic acid radical is split off and the product is diazotised further. The final coupling takes place under the same conditions as described in Example 1, to 20.7 parts of 1-methyl-2-phenyl-indole. A dyestuff of the formula

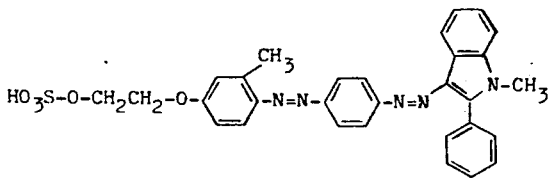

is obtained, which dyes polyamide in yellowish-tinged orange shades.

If the procedure indicated in the preceding examples is followed and the starting components, middle components and terminal components indicated in the table below are used, further disazo dyestuffs of the general formula (I) are obtained.

| Example | Starting Component | Middle Component | Terminal Component |
|---|---|---|---|
| 10 | Acid sulphuric acid ester of ethylene glycol-(4-amino-phenyl)-ether | Aniline | 2-Phenyl-indole |
| 11 | " | " | 2-Methyl-indole |
| 12 | " | " | 1-β-Cyanoethyl-2-phenyl-indole |
| 13 | " | " | β-(2-Phenylindolyl-1)-propionic acid amide |
| 14 | " | " | 2-Phenyl-indole-5-sulphonic acid |
| 15 | " | " | 2-Phenyl-5-nitro-indole |
| 16 | " | " | 2-Methyl-5-chloro-indole |
| 17 | " | " | 2,5-Dimethyl-indole |
| 18 | " | " | 2-Methyl-7-chloro-indole |

-continued

| Example | Starting Component | Middle Component | Terminal Component |
|---|---|---|---|
| 19 | '' | m-Toluidine | 2-Methyl-indole |
| 20 | '' | '' | 1-β-Cyanoethyl-2-phenyl-indole |
| 21 | '' | '' | 2,5-Dimethyl-indole |
| 22 | '' | '' | 2-Phenyl-indole-5-sulphonic acid |
| 23 | '' | '' | β-(2-Phenylindolyl-1)-propionic acid amide |
| 24 | '' | '' | 2-Methyl-7-chloro-indole |
| 25 | '' | '' | 2,5-Dimethyl-indole |
| 26 | '' | '' | 2-Methyl-5-chloro-indole |
| 27 | '' | 3-Amino-4-methoxy-toluene | 1-β-Cyanoethyl-2-phenyl-indole |
| 28 | '' | '' | 2,5-Dimethyl-indole |
| 29 | '' | '' | 2-Phenyl-indole-5-sulphonic acid |
| 30 | '' | '' | 1-Methyl-2-phenyl-6-bromo-indole |
| 31 | '' | '' | 2-Methyl-7-chloro-indole |
| 32 | '' | '' | 1-β-Cyanoethyl-2,6-dimethyl-indole |
| 33 | '' | '' | β-(2-Phenylindolyl-1)-propionic acid amide |
| 34 | '' | 3-Amino-anisole | 2-Phenyl-indole |
| 35 | '' | '' | 2-Methyl-indole |
| 36 | '' | '' | 1-Methyl-2-phenyl-indole |
| 37 | '' | '' | 1-β-Cyanoethyl-2-phenyl-indole |
| 38 | '' | '' | 1-β-Cyanoethyl-2-methyl-indole |
| 39 | '' | '' | 2-Phenyl-indole-5-sulphonic acid |
| 40 | '' | '' | 2,5-Dimethyl-indole |
| 41 | '' | 2-Amino-toluene | 2-Phenyl-indole |
| 42 | '' | '' | 2-Methyl-indole |
| 43 | '' | '' | 1-Methyl-2-phenyl-indole |
| 44 | '' | '' | 2,5-Dimethyl-indole |
| 45 | '' | 3-Amino-ethyl-benzene | 2-Phenyl-indole |
| 46 | '' | '' | 2-Methyl-indole |
| 47 | '' | '' | 1-Methyl-2-phenyl-indole |
| 48 | '' | '' | 1-β-Cyanoethyl-2-phenyl-indole |
| 49 | '' | 2-Amino-ethyl-benzene | 2-Phenyl-indole |
| 50 | '' | '' | 2-Methyl-indole |
| 51 | '' | '' | 1-Methyl-2-phenyl-indole |
| 52 | '' | '' | 2-Methyl-5-chloro-indole |
| 53 | '' | '' | 2,5-Dimethyl-indole |
| 54 | '' | '' | 2-Methyl-7-chloro-indole |
| 55 | '' | '' | 2-Phenyl-indole-5-sulphonic acid |
| 56 | '' | 3-Chloro-aniline | 2-Phenyl-indole |
| 57 | '' | '' | 2-Methyl-indole |
| 58 | '' | '' | 1-Methyl-2-phenyl-indole |
| 59 | '' | '' | 1-β-Cyanoethyl-2-phenyl-indole |
| 60 | '' | 3-Bromo-aniline | 1-Methyl-2-phenyl-indole |
| 61 | '' | '' | 2-Phenyl-indole |
| 62 | '' | '' | 2-Methyl-indole |
| 63 | '' | 2-Amino-anisole | 1-β-Cyanoethyl-2-phenyl-indole |
| 64 | '' | '' | 2-Phenyl-indole |
| 65 | '' | '' | 2-Methyl-indole |
| 66 | '' | '' | 2,5-Dimethyl-indole |
| 67 | '' | 3-Amino-ethoxy-benzene | 2-Phenyl-indole |
| 68 | '' | '' | 1-Methyl-2-phenyl-indole |
| 69 | '' | '' | 1-β-Cyanoethyl-2-phenyl-indole |
| 70 | '' | '' | 2-Phenyl-indole-5-sulphonic acid |
| 71 | '' | '' | 2-Methyl-7-chloro-indole |
| 72 | '' | '' | 2-Phenyl-5-nitro-indole |
| 73 | '' | 1-Amino-2,3-dimethyl-benzene | 2-Phenyl-indole |
| 74 | '' | '' | 2-Methyl-indole |
| 75 | '' | '' | 1-Methyl-2-phenyl-indole |
| 76 | '' | 1-Amino-2,5-dimethyl-benzene | 2-Phenyl-indole |
| 77 | '' | '' | 1-Methyl-2-phenyl-indole |
| 78 | '' | '' | 1-β-Cyanoethyl-2-phenyl-indole |
| 79 | '' | '' | 2,5-Dimethyl-indole |
| 80 | '' | 2-Amino-4-methoxy-toluene | 2-Phenyl-indole |
| 81 | '' | '' | 1-Methyl-2-phenyl-indole |
| 82 | '' | '' | 2-Methyl-indole |
| 83 | '' | '' | 1-β-Cyanoethyl-2-phenyl-indole |
| 84 | '' | '' | β-(2-Phenylindolyl-1)-propionic acid amide |
| 85 | '' | 2-Amino-1,4-dimethoxy-benzene | 2-Methyl-indole |
| 86 | '' | '' | 2-Phenyl-indole |
| 87 | '' | '' | 1-Methyl-2-phenyl-indole |
| 88 | '' | '' | 2-Phenyl-indole-5-sulphonic acid |
| 89 | '' | '' | 2,5-Dimethyl-indole |
| 90 | '' | '' | 2-Methyl-7-chloro-indole |
| 91 | '' | 2-Amino-4-ethoxy-toluene | 2-Phenyl-indole |
| 92 | '' | '' | 2-Methyl-indole |
| 93 | '' | '' | 1-Methyl-2-phenyl-indole |
| 94 | '' | 2-Amino-1,4-diethoxy-benzene | 2-Phenyl-indole |
| 95 | '' | '' | 2-Methyl-indole |
| 96 | '' | '' | 2-Phenyl-indole-5-sulphonic acid |
| 97 | '' | '' | 2,5-Dimethyl-indole |
| 98 | '' | '' | 1-Methyl-2-phenyl-indole |
| 99 | '' | '' | 2-Methyl-7-nitro-indole |

-continued

| Example | Starting Component | Middle Component | Terminal Component |
|---|---|---|---|
| 100 | '' | '' | 2-Phenyl-5-nitro-indole |
| 101 | '' | '' | 2-Methyl-5-chloro-indole |
| 102 | '' | α-Naphthylamine | 2-Phenyl-indole |
| 103 | '' | '' | 2-Methyl-indole |
| 104 | '' | '' | 1-Methyl-2-phenyl-indole |
| 105 | '' | '' | 2-Phenyl-indole-5-sulphonic acid |
| 106 | '' | '' | 2,5-Dimethyl-indole |
| 107 | '' | '' | 2-Methyl-5-chloro-indole |
| 108 | '' | '' | 2-Phenyl-5-nitro-indole |
| 109 | '' | '' | 1-β-Cyanoethyl-2-phenyl-indole |
| 110 | '' | '' | β-(Phenylindolyl-1)-propionic acid amide |
| 111 | '' | m. Toluidine | 1-Methyl-2-phenyl-indole-5-sulfonic acid |
| 112 | '' | '' | 2,5-Dimethyl-indole-sulfonic acid |
| 113 | '' | Aniline | 1-Methyl-2-phenyl-indole-5-sulfonic acid |
| 114 | '' | '' | 2-Methyl-indole-5-sulfonic acid |
| 115 | '' | 2-Amino-1,4-dimethoxy-benzene | 1-Methyl-2-phenyl-indole-5-sulfonic acid |

If instead of the acid sulphuric acid ester of ethylene glycol-(4-aminophenyl)-ether, the acid sulphuric acid esters of ethylene glycol-(2-chloro-4-aminophenyl)-ether, -(3-chloro-4-aminophenyl)-ether, -(2,6-dichloro-4-aminophenyl)-ether, -(2,3-dichloro-4-amino-phenyl)-ether, -(2,5-dichloro-4-aminophenyl)-ether, -(3,5-dichloro-4-aminophenyl)-ether, -(2,3,5-trichloro-4-aminophenyl)-ether, -(2,3,6-trichloro-4-aminophenyl)-ether, -(2,3,5,6-tetrachloro-4-aminophenyl)-ether, -(2-bromo-4-aminophenyl)-ether, -(3-bromo-4-aminophenyl)-ether, -(2-methoxy-4-aminophenyl)-ether, -(3-methoxy-4-aminophenyl)-ether, -(3-ethoxy-4-aminophenyl)-ether, -(2-ethyl-4-aminophenyl)-ether, -(3-ethyl-4-aminophenyl)-ether, -(2-chloro-5-methoxy-4-aminophenyl)-ether, -(2-methyl-4-amino-phenyl)-ether, or -(3-methyl-4-aminophenyl)-ether are used, aniline, m-toluidine, 3-amino-4-methoxytoluene, 2-amino-toluene, 2-amino-ethylbenzene, 3-amino-ethylbenzene, 3-chloroaniline, 3-bromoaniline, 2-aminoanisole, 3-aminoanisole, 2-aminoethoxybenzene, 3-aminoethoxybenzene, 1-amino-2,3-dimethylbenzene, 1-amino-2,5-dimethylbenzene, 1-amino-3,5-dimethylbenzene, 2-amino-4-methoxy-toluene, 2-amino-1,4-dimethoxybenzene, 2-amino-4-ethoxytoluene, 2-amino-1,4-diethoxybenzene or α-naphthylamine are used as the middle components and the terminal components used are those indicated in the preceding table, dyestuffs which dye polyamide in orange, red and ruby shades are again obtained.

Instead of the acid sulphuric acid esters of ethylene glycol, the acid sulphuric acid esters of trimethylene glycol and propylene glycol can also be used.

We claim:
1. Disazo dyestuff which in the form of the free acid corresponds to the formula

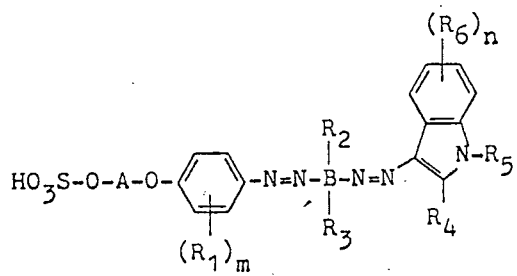

wherein
A is alkylene of 2–5 carbon atoms;
B is 1,4-phenylene or 1,4-naphthylene;

$R_1$, $R_2$, and $R_3$ independently are hydrogen, chloro, bromo, alkyl of 1–4 carbon atoms, cyanoalkyl of 1–4 carbon atoms, alkoxy of 1–6 carbon atoms, or alkoxy of 1–6 carbon atoms substituted by hydroxy or phenyl;
$R_4$ is alkyl of 1–4 carbon atoms, phenyl, or phenyl substituted by halo, alkyl of 1–4 carbon atoms, or alkoxy of 1–4 carbon atoms;
$R_5$ is hydrogen, alkyl of 1–4 carbon atoms, or alkyl of 1–4 carbon atoms substituted by cyano, $CONH_2$ of carboxy;
$R_6$ is alkyl of 1–4 carbon atoms alkoxy of 1–6 carbon atoms, chloro, bromo, or fluoro, nitro, sulfo, or cyano;
$m$ is a number from 1 to 4; and
$n$ is a number from 0 to 2.
2. The dyestuff of claim 1 wherein B is 1,4-phenylene.
3. Disazo dyestuff which in the form of the free acid corresponds to the formula

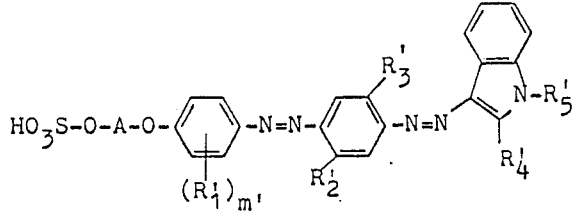

wherein
A is alkylene of 2–5 carbon atoms;
$R_1{}'$ is hydrogen, chloro, or methyl;
$R_2{}'$ is hydrogen, chloro, methyl, ethyl, methoxy, or ethoxy;
$R_3{}'$ is hydrogen, methoxy, or ethoxy;
$R_4{}'$ is methyl or phenyl;
$R_5{}'$ is hydrogen, alkyl of 1–4 carbon atoms or alkyl of 1–4 carbon atoms substituted by cyano, carbonamido, $CONH_2$ or carboxyl; and
$m'$ is the number 1 or 2.
4. The dyestuff of claim 3 wherein A is $—CH_2CH_2—$.
5. Disazo dyestuff which in the form of the free acid corresponds to the formula

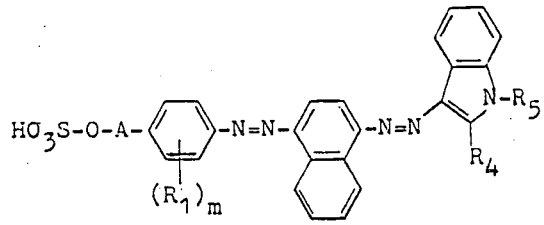

wherein
- A is alkylene of 2–5 carbon atoms;
- $R_1$ is hydrogen, chloro, bromo, alkoxy of 1–6 carbon atoms, or alkyl of 1–4 carbon atoms;
- $R_4$ is alkyl of 1–4 carbon atoms or phenyl;
- $R_5$ is hydrogen, alkyl of 1–4 carbon atoms, or alkyl of 1–4 carbon atoms substituted by cyano, carbonamido, $CONH_2$ or carboxyl; and
- $m$ is a number from 1 to 4.

6. Disazo dyestuff which in the form of the free acid corresponds to the formula

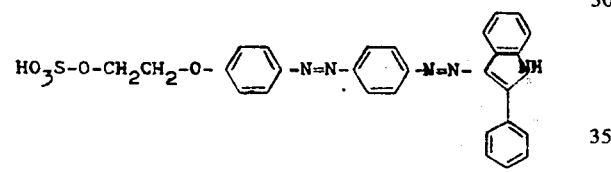

wherein
- $R_1{'}$ is hydrogen, chloro, or methyl;
- $R_4{'}$ is methyl or phenyl;
- $R_5{'}$ is alkyl of 1–4 carbon atoms or alkyl of 1–4 carbon atoms substituted by cyano, carbonamido, $CONH_2$ or carboxyl; and
- $m'$ is the number 1 or 2.

7. Disazo dyestuff of claim 1 of the formula

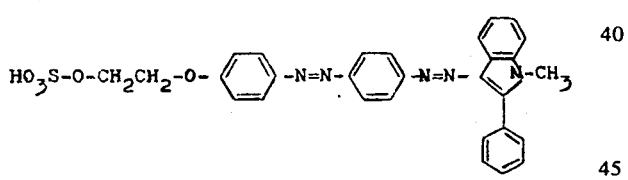

8. Disazo dyestuff of claim 1 of the formula

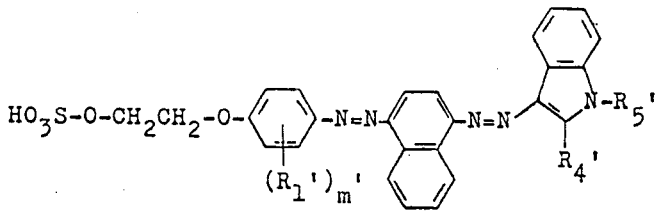

9. Disazo dyestuff of claim 1 of the formula

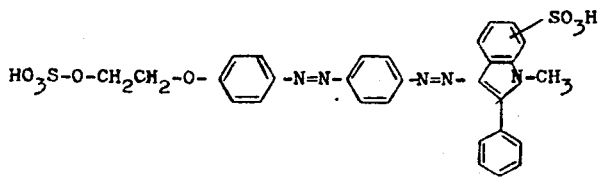

10. Disazo dyestuff of claim 1 of the formula

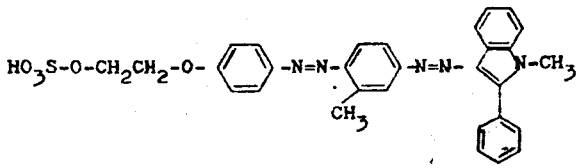

11. Disazo dyestuff of claim 1 of the formula

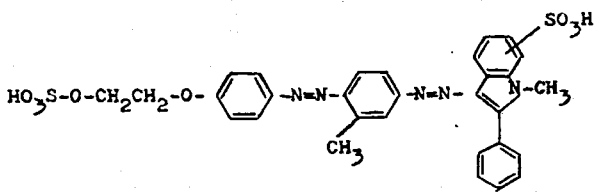

* * * * *